O. IKI.
FEED WATER PURIFIER.
APPLICATION FILED JAN. 11, 1917.
1,245,721.
Patented Nov. 6, 1917.
2 SHEETS—SHEET 2.
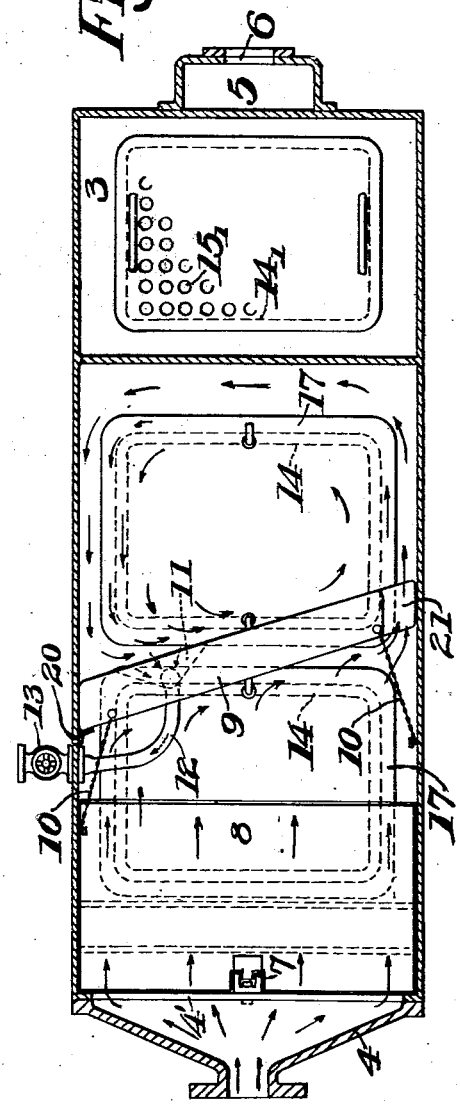
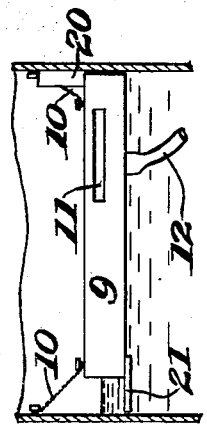
Inventor
Otohiko Iki
Attorney

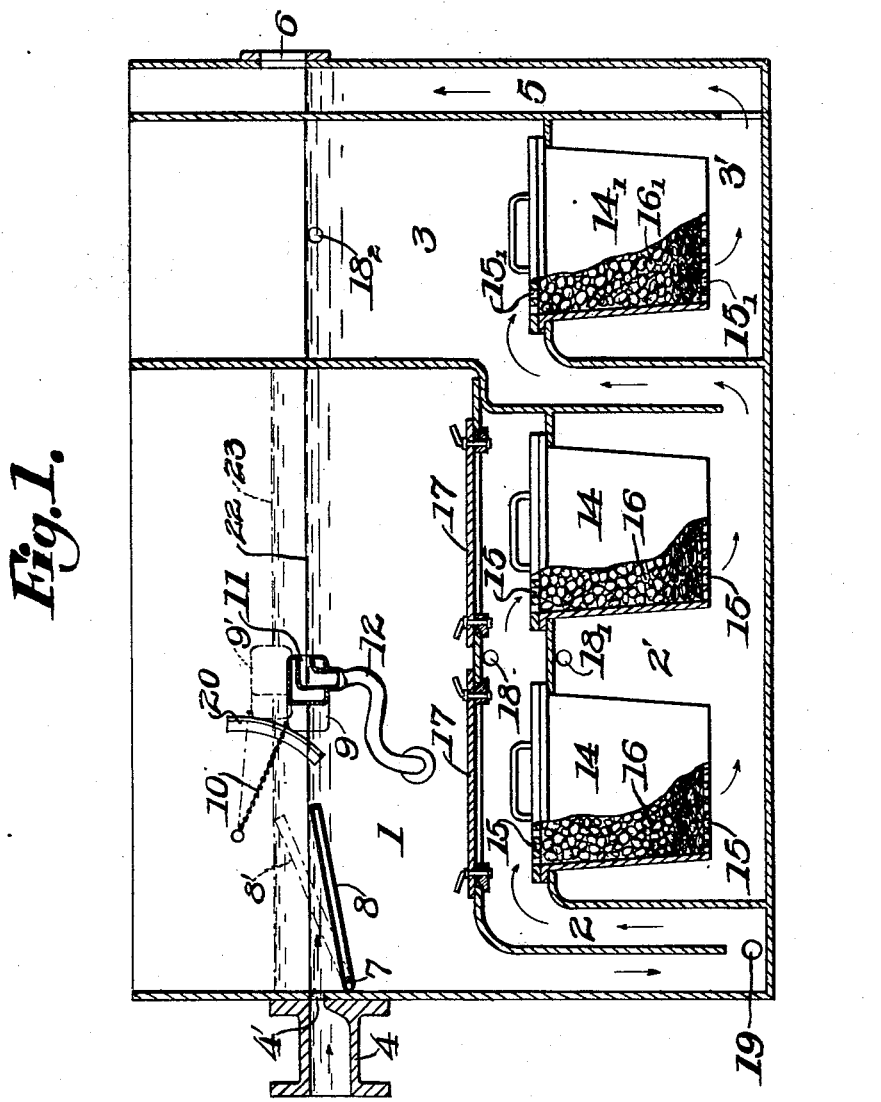

UNITED STATES PATENT OFFICE.

OTOHIKO IKI, OF MUKO GUN, HYOGO KEN, JAPAN.

FEED-WATER PURIFIER.

1,245,721.   Specification of Letters Patent.   Patented Nov. 6, 1917.

Application filed January 11, 1917. Serial No. 141,823.

*To all whom it may concern:*

Be it known that I, OTOHIKO IKI, subject of Japan, residing at No. 4, lot No. 128, Higashi Suma, Suma Machi, Muko Gun, Hyogo Ken, Japan, have invented new and useful Improvements in Feed-Water Purifiers, of which the following is a specification.

This invention relates to feed-water purifier, wherein a tank, divided into a number of chambers and provided with an inlet and an outlet constructed almost on the same level, is filled with fresh water at the outset; and the first of said chambers being fitted with an inlet which is a long but narrow slit, with a floating board an end of which is hinged below said inlet, and with a floating box which always floats on the surface of the water; and the other chambers being provided with filters, in the first chamber the water to be purified is made to spread out into a thin sheet and to drift over the fresh water therein, thus the oil contained therein floating and being separated, and then the water passes through filters in the second and succeeding chambers. The object of this invention is to purify feed-water effectually by separating and removing the oil mixed therein with little loss of water, at the same time maintaining the purifier in an efficient condition for a long time.

The appended drawings show this invention in which—

Figure 1 is a vertical section;

Fig. 2, a horizontal section; and

Fig. 3 is a transverse section of part of this invention showing a side view of the floating box. The same reference numbers refer to identical or corresponding parts in all the figures.

According to my invention, a tank, divided into the first separating chamber 1, the second separating chamber 2 2' and the third separating chamber 3 3', is first filled with fresh water; then the water to be purified is sent into the first chamber 1 through the inlet 4, and most of the oil mixed therein is made to separate and to float on the surface of the water. The water is then purified by filters in the second chamber 2 2' and again in the third chamber 3 3', and passing up the passage 5, finally runs out through an outlet 6 constructed on nearly the same level as the inlet 4.

The inlet 4 gradually narrows vertically but broadens sidewise until it forms a long narrow slit 4' and opens into the first separating chamber. In said chamber a water-spreading member in the form of a floating board 8 is hinged to the inner side of the tank below the inlet 4' by means of a kind of universal joint 7. This member 8, as will be seen from the drawings, is plate-like, and is a diffuser or diffuser member for the incoming oil-carrying water. It is made of wood, or of a thin hollow metal, and is so constructed that the end opposite to the joint always floats on the surface of the water, as may be seen in the drawings. 9 is a deflecting member in the form of a floating box made of wood or thin hollow metal and always floats on the surface of the water. Either end of said box is fastened to either side of the first chamber with a slender chain 10 or the like, and by adjusting the length thereof the box is kept in an oblique position as shown in Fig. 2. A guide 20 is fixed to one side of the tank for guiding the floating box on one end, and on the other end thereof a projection 21 reaching the other side of the tank is affixed under the water surface, so that the floating box is prevented from changing its position even when the tank is tossed sidewise or lengthwise. In one side of the floating box opens a long narrow opening 11 which is connected with a blow-off valve 13 by a flexible tube 12.

The second separating chamber 2 2' leads from the bottom of the first chamber 1, and in the partition wall dividing the sections 2 and 2' a number of filters 14 are fitted. These filters have numerous small holes 15 in the lids and in the bottoms, while the inside is filled with filtering materials such as coke, fibers of dish-cloth gourd or the like 16. To facilitate the work of changing these filtering materials when they get soiled, lids 17 are provided in the partition wall which divides the first and second chambers. 18 and $18_1$ are test cocks and 19 near the bottom between the first and second chambers is an opening for feeding fresh water.

The third separating chamber 3 3' leads from the bottom of the second chamber 2', and as in the second chamber filters $14_1$ are fitted to the partition wall dividing the sections 3 and 3'. From the bottom of the section 3' a passage 5 leads upward ending in an outlet 6 constructed on nearly the same level as the inlet 4'. The opening 18² is a blow-off hole for this chamber.

The purifier of my invention is to be used by first filling it with fresh water. Then the water to be purified, such as condensed oil-containing water which comes from the engine, is sent through the inlet 4. The inlet being a long narrow slit as has been stated above, the water passing through it flows over the surface of the fresh water in a thin layer and instead of disturbing and running into it, spreads over the whole surface thereof. It, however, produces a slight rippling motion, and the oil in the water thus rippled while flowing over the fresh water is separated from said water and floats on its surface. This floating oil and scum drift along the floating box in the current of water in the direction indicated by the arrows (see Fig. 2), and since the surface of the water on the other side of the floating box is smooth being protected from agitation by said floating box, the drifting oil does not run back nor disperse, but collects at this part and can easily be drained off. The uniform spreading of the incoming condensed water over the surface of the fresh water, is further insured by the floating board 8.

Since the floating box 9 is provided as aforesaid, with a blow-off device opening on the surface of the water, the separated oil flows into the hole 11, and consequently, whenever the blow-off valve 13 is opened, oil almost free from water runs out, no matter what may be the height of the water level.

The water, considerably freed of its oil by the above mentioned process in the first chamber, descends into the chamber 2 together with the fresh water filled at the outset and passes through the filters 14, where it is further freed of oil contained therein as fine particles by the filtering materials 16. In this chamber, too, the lighter water containing comparatively more oil, ascending and the purer water descending, the latter goes on to the third chamber and passing through further filters 14₁ undergoes further purification. In this chamber, too, the more oily water ascends, while the purer water descends, and the latter passing up the passage 5 flows out of the outlet 6.

When the filtering materials become soiled, they can be changed by opening the filters, and if the fresh water in the separating chambers becomes much soiled, new fresh water may be sent in through the fresh water feed hole 19. Fresh water being thus fed from below the soiled water is pushed up to a higher part and may be easily drained off. In this way the changing of fresh water may be effected very easily.

According to my invention, a greater part of oil contained in the water being taken away in the first chamber by making it float and comparatively purer water passing through the filters, the burden of the filters is light and even fine particles of oil may be effectually absorbed and removed by the filtering materials. Moreover, the filtering materials not easily getting soiled, which is in itself a considerable saving of labor, water may be perfectly purified; and the loss of fresh water is very small, since practically nothing but oil is drained off from the water surface in the first chamber, no matter what may be the height of said water surface.

Since the inlet 4' and the outlet 6 are almost on the same level, there is no danger of hindering the even spreading of the oil over the water as above described, since the inlet never becomes exposed above the water surface. If, owing to the increase of water, the surface of the water 22 rises to the chain line 23 (see Fig. 1) the floating box 9 will also rise to 9', and the floating board 8, too, rising to 8', guide the layer of water as before, and the rise or fall of the water surface in no wise affects the working of this invention.

Having thus described my invention, what I claim and desire to secure by Letters Patent is:—

1. A feed-water purifier consisting of a tank which is to be filled with fresh water at the outset, which tank is provided with a long narrow inlet; with a floating board having one end hinged to a part below the said inlet and the other end floating on the water, causing the incoming water to flow in a thin sheet; with filters positioned so as to filter the water before it leaves the tank, and with an outlet constructed almost on the same level as the said inlet, substantially as and for the purposes hereinbefore set forth.

2. A feed-water purifier comprising a tank having an inlet adapted to contain water which at the outset is fresh, said water being normally at a predetermined level; means for introducing impure feed-water into the tank comprising a buoyant diffuser and means for anchoring an end of the diffuser submerged adjacent to the inlet so that the diffuser rises toward said water level away from the inlet, whereby the impure feed-water introduced into the tank is guided by the diffuser to flow over the surface of the body of water therein in a thin sheet beyond the diffuser, and means for gradually discharging water from the tank to avoid rippling said surface.

3. A feed-water purifier comprising a tank having an inlet adapted to contain water which at the outset is fresh, said water being normally at a predetermined level; means for introducing impure feed-water into the tank comprising an upwardly inclined plate-like diffuser member arranged with its lower end submerged adjacent to the inlet and its upper end at the surface of the water at a distance from the inlet in the direction of the in-flow therethrough, whereby the impure feed-water introduced into the tank is guided by the diffuser member to flow over the surface of the body of the water in the tank in a thin sheet beyond the diffuser member, means for gradually discharging water from the tank, and means for decanting scum from the surface of the body of the water.

4. A feed-water purifier comprising a tank having an inlet adapted to contain water which at the outset is fresh, said water being normally at a predetermined level; means for introducing impure feed-water into the tank comprising an upwardly inclined plate-like diffuser member arranged with its lower end submerged adjacent to the inlet and its upper end at the surface of the water at a distance from the inlet in the direction of the inflow therethrough, whereby the impure feed-water introduced into the tank is guided by the diffuser member to flow over the surface of the body of the water in the tank in a thin sheet beyond the diffuser member, means for gradually discharging water from the tank, means for breaking the force of the flow of the said sheet of water and causing a deviation in the force of the same, and means for decanting the scum from the surface of the body of water at a point where the said sheet has become smooth.

5. A feed-water purifier comprising a tank adapted to contain water which at the outset is fresh, said water being normally at a predetermined level; an inlet for impure feed water which is located substantially at the surface of the body of water in the tank and which is narrow vertically and elongated horizontally so as to direct the incoming water onto the said surface in a thin sheet, and means for gradually discharging water from the tank.

6. A feed-water purifier comprising a tank having an inlet adapted to contain water which at the outset is fresh, said water being normally at a predetermined level; means for introducing impure feed-water into the tank comprising a buoyant diffuser and means for anchoring an end of the diffuser submerged adjacent to the inlet so that the diffuser rises toward said water level away from the inlet, whereby the impure feed-water introduced into the tank is guided by the diffuser to flow over the surface of the body of water therein in a thin sheet beyond the diffuser, and means for gradually discharging water from the tank to avoid rippling said surface, and a deflecting member projecting above the said surface and presenting a horizontally inclined face adapted to break the force of flow of the said sheet of water and to cause a deviation in the course of the same.

7. A feed-water purifier comprising a tank having an inlet adapted to contain water which at the outset is fresh, said water being normally at a predetermined level; means for introducing impure feed-water into the tank comprising a buoyant diffuser and means for anchoring an end of the diffuser submerged adjacent to the inlet so that the diffuser rises toward said water level away from the inlet, whereby the impure feed-water introduced into the tank is guided by the diffuser to flow over the surface of the body of water therein in a thin sheet beyond the diffuser, and means for gradually discharging water from the tank to avoid rippling said surface, and a deflecting member projecting above the said surface and presenting a horizontally inclined face adapted to break the force of flow of the said sheet of water and to cause a deviation in the course of the same, and means for decanting scum from the surface of the body of liquid at the opposite side of the deflecting member with respect to the said inclined face.

8. A feed-water purifier comprising a tank having an inlet adapted to contain water which at the outset is fresh, said water being normally at a predetermined level; means for introducing impure feed-water into the tank comprising a buoyant diffuser and means for anchoring an end of the diffuser submerged adjacent to the inlet so that the diffuser rises toward said water level away from the inlet, whereby the impure feed-water introduced into the tank is guided by the diffuser to flow over the surface of the body of water therein in a thin sheet beyond the diffuser, and means for gradually discharging water from the tank to avoid rippling said surface, and a floating deflecting member projecting above the said surface and presenting a horizontally inclined face adapted to break the force of flow of the said sheet of water and to cause a deviation in the course of the same.

9. A feed-water purifier comprising a tank having an inlet adapted to contain water which at the outset is fresh, said water being normally at a predetermined level; means for introducing impure feed-water into the tank comprising a buoyant diffuser and means for anchoring an end of the diffuser submerged adjacent to the inlet so that the diffuser rises toward said water level away from the inlet, whereby the impure feed-water introduced into the tank is guided by the diffuser to flow over the surface of the body of water therein in a thin sheet beyond the diffuser, and means for gradually discharging water from the tank to avoid rippling said surface, and a floating deflecting member projecting above the said surface and presenting a horizontally inclined face adapted to break the force of flow of the said sheet of water and to cause a deviation in the course of the same, the said deflecting member being provided with a decanting outlet for scum opening through the opposite side of the same with respect to the said inclined face and disposed at the surface of the water, and means for conducting scum away from said outlet.

10. A feed-water purifier comprising a tank adapted to contain water which at the outset is fresh, said water being normally at a predetermined level, an inlet for impure feed-water provided in the tank and shaped to cause the water to flow along the surface of the body of water therein, a water-spreading member positioned in the water of the tank in front of the inlet and having a horizontal edge rising to the surface, and means for gradually discharging water from the tank so as to leave the surface of the water substantially without ripples.

11. A feed-water purifier comprising a tank adapted to contain water which at the outset is fresh, said water being normally at a predetermined level, an inlet for impure feed-water provided in the tank and shaped to cause the water to flow along the surface of the body of water therein, a buoyant water-spreading member pivotally mounted in the water of the tank and adapted to float normally in vertically inclined position with a horizontal edge rising to the surface of the water in front of the said inlet, and means for gradually discharging water from the tank.

12. A feed-water purifier consisting of a tank to be filled with fresh water at the outset and divided into a number of chambers in such a manner that one chamber opens at the bottom to the next chamber and leads to the top of the latter; a long narrow inlet and floating board which make the incoming water flow in a thin sheet over the surface of the water in said tank; and filters positioned so as to filter the water before it leaves the tank, substantially as and for the purposes hereinbefore set forth.

13. A feed-water purifier consisting of a tank to be filled with fresh water at the outset and divided into a number of chambers in such a manner that one chamber opens to the next at the bottom and leads to the top of the latter, a long narrow inlet to said tank, a floating board one end of which is hinged to a part below said inlet and the other end floats on the surface of the water in the first chamber, a floating box which floats on the surface of the water in the first chamber, an opening in said floating box opening on the water level, a blow-off device connected with said opening by a flexible tube, filters in the second and succeeding chambers for filtering the water coming through the bottom of the first chamber, and an outlet constructed on nearly the same level as the aforesaid inlet through which the water filtered and led from the bottom of the last chamber is to be discharged, substantially as and for the purposes hereinbefore set forth.

In testimony whereof I have signed my name to this specification in the presence of two subscribing witnesses.

OTOHIKO IKI.

Witnesses:
YOSHIKA IKEDA,
TOMEJIRO KILEIJIMCE.